(12) United States Patent
Kim et al.

(10) Patent No.: US 12,286,184 B2
(45) Date of Patent: Apr. 29, 2025

(54) WAIST BELT AND SAFETY APPARATUS FOR PROTECTING MOTORCYCLE DRIVER

(71) Applicants: Do Nam Kim, Cheonan-si (KR); Chan Kim, Cheonan-si (KR); Jung Kim, Daejeon (KR); Bom Kim, Chungcheongbuk-do (KR)

(72) Inventors: Do Nam Kim, Cheonan-si (KR); Chan Kim, Cheonan-si (KR); Jung Kim, Daejeon (KR); Bom Kim, Chungcheongbuk-do (KR)

( * ) Notice: Subject to any disclaimer, the term of this patent is extended or adjusted under 35 U.S.C. 154(b) by 0 days.

(21) Appl. No.: 18/690,749

(22) PCT Filed: Sep. 5, 2022

(86) PCT No.: PCT/KR2022/013255
§ 371 (c)(1),
(2) Date: Mar. 11, 2024

(87) PCT Pub. No.: WO2023/038373
PCT Pub. Date: Mar. 16, 2023

(65) Prior Publication Data
US 2024/0400146 A1  Dec. 5, 2024

(30) Foreign Application Priority Data

Sep. 13, 2021 (KR) .......................... 10-2021-0121933

(51) Int. Cl.
*B62J 27/10* (2020.01)
*B62J 27/20* (2020.01)

(52) U.S. Cl.
CPC ............... *B62J 27/10* (2020.02); *B62J 27/20* (2020.02)

(58) Field of Classification Search
CPC .................................. B62J 27/10; B62J 27/20
See application file for complete search history.

(56) References Cited

U.S. PATENT DOCUMENTS

| 3,930,667 | A | * | 1/1976 | Osuchowski | ........... B60R 21/16 441/103 |
| 4,825,469 | A | * | 5/1989 | Kincheloe | ............ A42B 3/0486 2/466 |

(Continued)

FOREIGN PATENT DOCUMENTS

| JP | 3070441 U | 8/2000 |
| JP | 2010163136 A | * | 7/2010 |

(Continued)

*Primary Examiner* — Drew J Brown
(74) *Attorney, Agent, or Firm* — NKL Law; Jae Youn Kim

(57) ABSTRACT

The present invention relates to a waist belt and safety apparatus for protecting a motorcycle driver, wherein the motorcycle driver wears the waist belt having an airbag tube built therein, and in the event of a collision, expansion gas is supplied to the airbag tube to expand the airbag tube to cover the driver's front and back such that the driver is protected. According to the present invention, the airbag tube is built in the waist belt worn on the driver's waist, wherein the airbag tube spreads upward and downward in the waist belt when nitrogen gas is supplied, and the nitrogen gas is supplied to the airbag tube from a nitrogen tank of a gas supply apparatus built in a motorcycle driving stand or from a nitrogen tank suspended from the back of the waist belt.

4 Claims, 15 Drawing Sheets

(56) References Cited

U.S. PATENT DOCUMENTS

| | | | | |
|---|---|---|---|---|
| 7,401,364 | B2* | 7/2008 | Goto | B62J 27/20 2/102 |
| 2002/0092088 | A1* | 7/2002 | Duhamell | A41D 13/018 2/463 |
| 2011/0237194 | A1 | 9/2011 | Kojima et al. | |
| 2014/0047623 | A1* | 2/2014 | Richards | A41D 13/018 2/455 |
| 2014/0123374 | A1* | 5/2014 | Gelston | A41D 13/018 2/455 |
| 2016/0000158 | A1* | 1/2016 | Davis | A63B 69/18 2/455 |

FOREIGN PATENT DOCUMENTS

| | | |
|---|---|---|
| JP | 2018052285 A | 4/2018 |
| KR | 20150125679 A | 11/2015 |

* cited by examiner

WAIST BELT AND SAFETY APPARATUS FOR PROTECTING MOTORCYCLE DRIVER

TECHNICAL FIELD

The present invention relates to a waist belt and a safety apparatus for protecting a motorcycle driver, which when a motorcycle driver wears the waist belt having an airbag tube embedded therein, can supply inflation gas to an airbag tube in the event of a collision accident such that the airbag tube expands to cover the driver's front and back, thereby protecting the driver.

BACKGROUND ART

When an accident such as a collision or a rear-end collision occurs while a motorcycle rider drives in a state of sitting on the driver's seat without a separate safety device, since a motorcycle falls down and the rider also falls or bounces to the front, resulting in the rider's body not being protected. So, efforts are being made to reduce injuries of the rider in various forms.

One of the efforts is to install an airbag tube of a predetermined size inside a jacket or pants worn by the rider, and install a nitrogen tank, which inflates the airbag tube, on one side of the jacket. However, jackets or pants must allow the rider to move freely when worn, and the nitrogen tank can supply only the amount of gas to inflate a portion of the airbag tube due to the limitation in size of the nitrogen tank. Thus, in the event of a collision accident, the airbag tube can buffer only a portion of the impact on the rider, and cannot prevent injuries from the impact at areas not covered by the jacket or pants.

As described above, if integrating airbag tubes into a jacket or pants to protect a motorcycle rider, since the size of the airbag tube cannot be increase and the airbag tube can be inflated partially due to the insufficient amount of nitrogen gas supplied to the airbag tube, the airbag tube cannot provide a perfect buffer function but can buffer only fatal impact. Additionally, even if parts of the upper or lower body of the rider are protected by wearing the jacket or pants or a helmet with integrated airbag tubes, the safety of the rider's arms, face, or legs cannot be guaranteed.

In other words, because exposed parts of the rider's body, shoulders, or legs are not adequately protected by integrated airbag tubes in the jacket or pants, it was necessary to demand a safety device sufficient to protect the rider.

Meanwhile, Korean Patent Publication No. 10-2015-0125679 discloses a protection system where an airbag tube is embedded in the seat of a motorcycle. However, since the protection system is installed in the seat on which the rider sits, the height of the driver's seat increases, causing difficulty in driving. Furthermore, since the protection system is integrated into the motorcycle, the protection system cannot be applied to other motorcycles.

PATENT LITERATURE

[Patent Document 1] Korean Patent Publication No. 10-2015-0125679 (published on Nov. 9, 2015)
[Patent Document 2] Japanese Utility Model Registration No. 3070441 (granted on Aug. 4, 2000)
[Patent Document 3] US Patent No. 2011/0237194 (granted on Sep. 29, 2011)
[Patent Document 4] Japanese Patent Publication No. 2010-163136 (published on Jul. 29, 2010)

DISCLOSURE

Technical Problem

The present invention is to overcome the problem of insufficient inflation of the airbag tube embedded in the jacket worn by the motorcycle rider due to a shortage of nitrogen gas supplied at the time of a collision accident, the problem that the airbag tube could not sufficiently surround the shoulders, the legs or the face at the time of a collision accident, and the problem that there is a restriction in movement when the driver wears the waste belt since the jacket having the airbag tube therein is thick. An objective of the present invention is to provide a waist belt which embeds airbag tubes therein and is worn on the waist of a motorcycle driver, and supplies sufficient nitrogen gas in the event of a collision accident, thereby reducing casualty accidents by expanding the airbag tubes to envelop the front and rear of the driver.

Specifically, since the jacket type airbag tube embedded in the jacket cannot expand sufficiently, the conventional airbag tube can prevent only the minimum damages, However, the present invention can protect the driver by sufficiently expanding the airbag tubes.

Technical Solution

To accomplish the above-mentioned objects, according to the present invention, there is provided a waist belt which includes airbag tubes embedded therein and is worn around the waist of a driver, wherein the airbag tubes expand upward and downward from the waist belt when nitrogen gas is supplied, the nitrogen gas is supplied to the airbag tubes from a nitrogen tank of a gas supply apparatus embedded in a motorcycle driving stand or from a nitrogen tank suspended on the back of the waist belt, so the airbag tubes expand when the nitrogen gas of the nitrogen tank is supplied to the airbag tubes in the event of a collision accident, and in this instance, expand upward and downward from the waist belt to sufficiently envelop the driver, thereby protecting the driver from impact.

The waist belt worn on the waist of the driver includes the airbag tubes, which are embedded inside the waste belt in a folded state and expand upward and downward when nitrogen gas is supplied. The airbag tubes expand to surround from the chest part to the face part of the driver and to surround the lateral side and the rear side of the driver. The airbag tubes maintain the folded state inside the waist belt normally, and expand upward and downward from the waist belt to sufficiently surround the front and rear of the driver when nitrogen gas is supplied, thereby protecting the driver.

Each of the airbag tubes embedded in the waist belt includes an exposure groove to allow the arm to be exposed so that the lateral side of the airbag tube is inserted into the armpit when expanding, and a thin connection fabric for connecting the airbag tubes on the front and rear sides.

In the present invention, the nitrogen gas is supplied to the airbag tubes from a gas supply apparatus embedded in a motorcycle driving stand, wherein a fixed belt connected to the gas supply apparatus and a movable belt connected to the waist belt are coupled through a coupling device. A nitrogen tank supplying nitrogen gas enough to expand the airbag tubes is embedded in the gas supply apparatus. The gas supply apparatus maintains a state of being fixed to the driving stand by a lock device normally, but when a collision accident occurs, the lock device is released, so the gas supply apparatus is separated from the driving stand and the nitrogen gas filling in the nitrogen tank of the gas supply apparatus is supplied to the airbag tubes of the waist belt by a gas shut-off device, such that the airbag tubes expand to envelop the front and rear of the driver, thereby protecting the driver.

The gas supply apparatus and the waist belt of the present invention allow the fixed belt and the movable belt to be coupled through the coupling device, wherein the coupling device includes a female coupler fixed to the fixed belt and a male coupler fixed to the movable belt, and pipes are respectively embedded in the male coupler and the female coupler. When the male coupler and the female coupler are coupled, the pipes engage each other to achieve the supply of nitrogen gas. The male coupler and the female coupler maintain the coupled state unless the driver presses a release button. The coupled state of the male coupler and the female coupler is maintained while the driver is sitting on the motorcycle seat, but is released when the driver breaks away from the motorcycle seat, such that the driver can move freely. The pipe of the female coupler is elastically mounted by a spring, thereby maintaining adhesion when the pipe of the male coupler is fit.

Furthermore, the nitrogen tank is integrally fixed to the back of the waist belt worn by the driver, so can move together with the driver when the driver wears the waist belt, wherein the nitrogen gas filling in the nitrogen tank is supplied to the airbag tubes of the waist belt through a gas shut-off device. The gas shut-off device couples one side of a collision detection string, of which the other side is fixed to the motorcycle, via a ring. Accordingly, in the event of a collision accident, when the driver strongly pulls the collision detection string connected to the gas shut-off device, the nitrogen gas of the nitrogen tank inflates the airbag tubes, thereby protecting the driver.

The present invention recognizes a collision detection signal detecting collision of the motorcycle and transmits a Bluetooth signal to operate the gas shut-off device such that the nitrogen gas is supplied from the nitrogen tank fixed to the back of the waist belt to the airbag tubes of the waist belt, thereby expanding the airbag tubes.

Advantageous Effect

When an accident occurs while the driver is driving in a state of wearing the waist belt, the present invention supplies a sufficient amount of nitrogen gas to the airbag tubes embedded in the waist belt so that the airbag tubes expand to envelop the front and rear of the driver, thereby remarkably reducing the impact on the driver and minimizing the risk of injury.

The present invention allows the driver to move while wearing the waist belt and allows the waist belt to be connected to the gas supply apparatus only when the driver drives the motorcycle. Thus, the present invention can supply sufficient nitrogen gas in the state in which the gas supply apparatus is connected to the waist belt, thereby ensuring the proper expansion of the airbag tubes.

The present invention enables the supply of nitrogen gas from the nitrogen tank fixed to the back of the waist belt, eliminating the need for gas supply from the gas supply apparatus embedded in the driving stand.

Since the driver usually moves wearing the waist belt, the present invention can solve the problem that the conventional airbag tube embedded in the jacket could not expand sufficient, ensures comfortable movement and wearability of the waist belt during normal activities, and effectively protects the driver from impact by sufficiently expanding the airbag tubes to envelop the front and rear of the driver in the event of a collision accident.

The present invention allows for easy wearability and mobility while wearing the waist belt during normal activities. In addition, during driving, the present invention connects the waist belt to the coupling device so that the airbag tubes expand by being supplied with sufficient nitrogen gas in the event of a collision accident, thereby protecting the driver.

MODE FOR INVENTION

Figure 1:
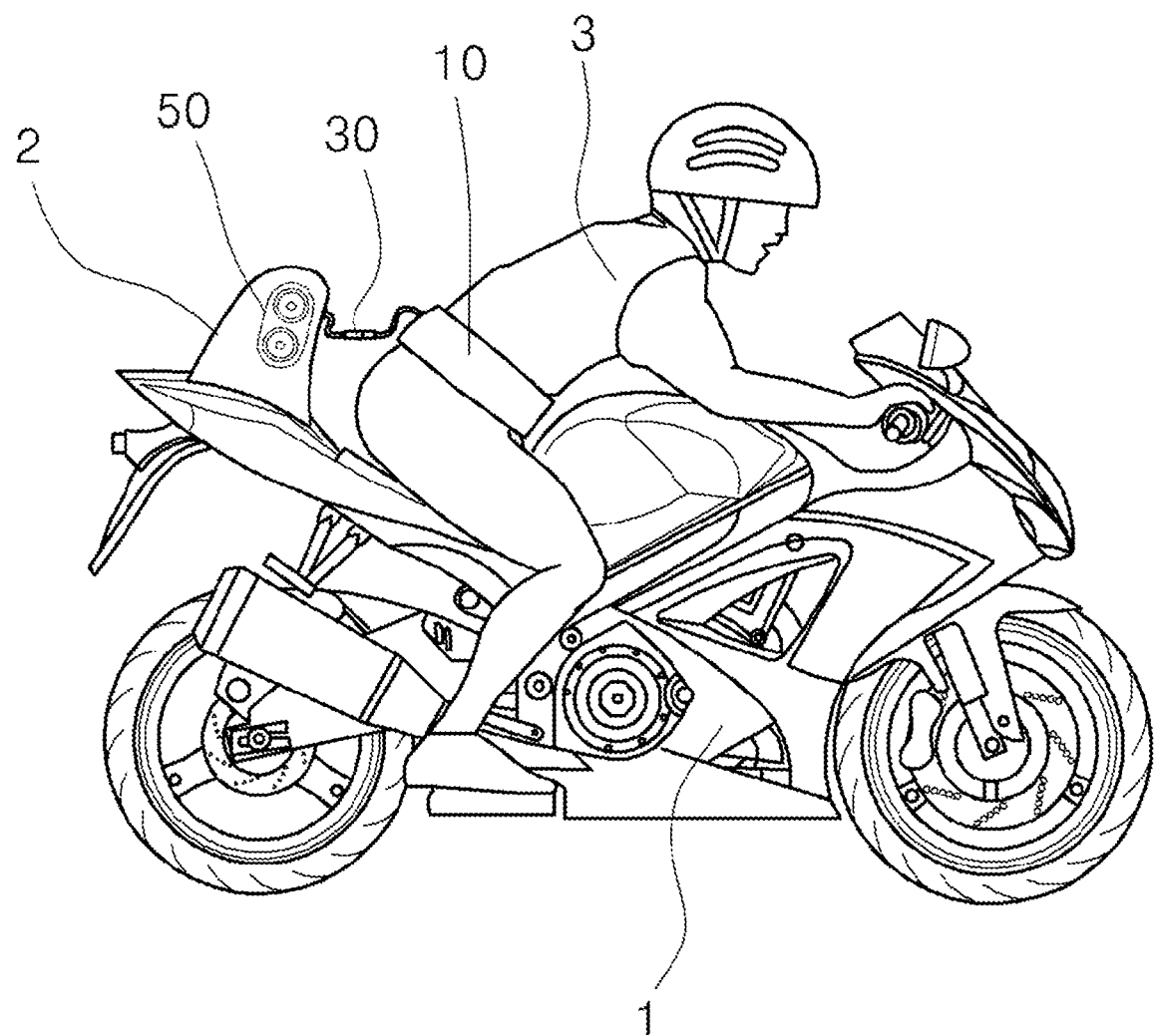
FIG. 1 is a view illustrating a state in which a driver drives a motorcycle according to an embodiment of the present invention.

The present invention relates to a waist belt with an embedded airbag tube that expands to envelop the front and rear of a driver when nitrogen gas is supplied, enabling the driver to drive a motorcycle and to move freely apart from riding the motorcycle while wearing the waist belt around the waist. The airbag tube of the waist belt expands to envelop the front and rear of the driver to protect the driver in the event of a collision accident during driving, and the driver can freely move while wearing the waist belt around the waist normal times.

The airbag tube embedded in the waist belt of the present invention receives nitrogen gas from a nitrogen tank integrated into a gas supply apparatus installed in a rider support of the motorcycle or from a nitrogen tank fixed to the back of the waist belt. When the driver sits on the motorcycle seat to drive the motorcycle, the waist belt and the gas supply apparatus are connected via a coupling device, or a collision detection strap is connected. Thus, in the event of a collision accident during driving, nitrogen gas is supplied to the airbag tube of the waist belt by the coupling device or the collision detection strap, and the airbag tube expands to envelop the front and rear of the driver. To move away from the motorcycle, the coupling device or the collision detection strap is separated to allow the driver's free movement.

When the airbag tube embedded in the waist belt worn by the driver expands, the airbag tube receives sufficient nitrogen gas and expands to envelop the front and rear of the driver, thereby protecting the driver by expansion of the airbag tube even if the driver breaks away from the motorcycle in the event of a collision accident.

In the present invention, the airbag tube which expands to envelop the front and rear of the driver sufficiently when inflated is embedded in the waist belt which the driver wears around the waist. Nitrogen gas supplied to the airbag tube is supplied from the nitrogen tank. The nitrogen tank is embedded in the gas supply apparatus installed in the rider support of the motorcycle and is connected to the waist belt before the driver drives to supply nitrogen gas to the airbag tube in the event of a collision accident, or is hung on the back of the waist of the driver so that nitrogen gas expands the airbag tube in the event of a collision accident.

The former method of the present invention is to supply nitrogen gas of the nitrogen tank to the airbag tube of the waist belt by detecting the collision accident by a collision sensor, and the latter method is to supply nitrogen gas of the nitrogen tank to the airbag tube of the waist belt by detecting the driver's breakaway in the event of a collision accident by a collision detection strap or by a detection signal transmitted via Bluetooth.

Hereinafter, the present invention will be described in detail with reference to the accompanying exemplary drawings.

The present invention relates to a waist belt 10 worn around the waist of a driver 3. The driver 3 wears the waist belt 10 only when driving a motorcycle 1, and airbag tubes 11 and 12 are embedded in the waist belt 10. The airbag tubes 11 and 12 spread and expand vertically when nitrogen gas is supplied, thereby protecting the driver in the event of a collision accident by sufficiently enveloping the front and rear of the driver 3 while expanding.

While the driver drives the motorcycle 1 wearing the waist belt 10 having airbag tubes 11 and 12 therein, in the event of a collision accident, nitrogen gas of a sufficient amount is supplied to the airbag tubes 11 and 12 and the airbag tubes 11 and 12 expand to envelop the front and rear of the driver 3, thereby protecting the driver 3. So, the present invention shows a significant difference in driver protection compared to conventional airbag-integrated jackets with limitation in expansion.

When the airbag tube 11 of the present invention expands upward, to expand in a state in which the airbag tube 11 is inserted into the armpit area, a portion of the airbag tube 11 inserted into the armpit area is connected with a thin connection fabric 13 and has an exposure groove 14 to allow the arm to fit. Thus, in the event of a collision accident, the airbag tubes 11 and 12 expand to envelop the front and rear of the driver, while the driver's arm is fit to the exposure groove 14 and the connection fabric 13 is inserted into the armpit.

The driver wears the waist belt 10 only when riding a motorcycle 1. Nitrogen gas is supplied to the airbag tubes 11 and 12 from the nitrogen tank embedded in a gas supply apparatus 50 installed in the driving stand 2 or from a nitrogen tank 51 fixed to the back of the waist belt 10. Hereinafter, the use of the gas supply apparatus 50 will be described first, and the use of the nitrogen tank 51 will be described later.

To utilize the nitrogen gas from the nitrogen tank embedded in the gas supply apparatus 50, a movable belt 20 of a predetermined length is first fixed to the rear of the waist belt 10, and the leading end of the movable belt 20 is coupled with a male coupler 31 of the coupling device 30. A pipe 21 is embedded inside the movable belt 20, so that nitrogen gas is supplied to the airbag tubes 11 and 12 embedded in the waist belt 10 through the pipe 21 when the male coupler 31 is coupled to a female coupler 32.

The waist belt 10 of the present invention is designed to be fastened and detached at the front of the driver 3 like a conventional belt, and forms the movable belt 20 of a predetermined length to the rear of the waist belt 10. The airbag tubes 11 and 12 are embedded inside the waist belt 10 separately, and when nitrogen gas is supplied to the airbag tubes 1112, the airbag tubes 11 and 12 expand vertically to envelop the driver's 3 face and feet.

Since the airbag tubes 11 and 12 embedded in the waist belt 10 usually remain in a built-in state, the driver 3 is not restricted in movement. Especially, since the movable belt 20 with the predetermined length is coupled to the coupling device 30, it allows for some movement during driving, so the driver does not feel a limitation due to the length of the movable belt 20. When the driver breaks away from the motorcycle after driving, since the driver separates the movable belt 20 from the coupling device 30, the driver does not feel restriction in movement even if wearing the waist belt 10.

That is, the waist belt 10 worn by the driver 3 includes the airbag tubes 11 and 12 that expand upward and downward inside the waist belt 10. The airbag tubes 11 and 12 expand to envelop the front and rear of the driver. The airbag tubes 11 and 12 usually remain embedded inside the waist belt 10, and expand to envelop the front and rear of the driver 3 when nitrogen gas is supplied, thereby protecting the driver 3.

Meanwhile, the gas supply apparatus 50 of the present invention includes a nitrogen tank 51 which supplies nitrogen gas of a sufficient amount when the airbag tubes 11 and 12 embedded in the waist belt 10 expand. The gas supply apparatus 50 is normally fixed inside the rider support 2 by a lock device 70, but in the event of a collision accident, the lock device 70 is released by an electric signal supplied from a collision sensor (not shown) so that the gas supply apparatus 50 can be separated from the driving stand 2.

The gas supply apparatus 50 is installed to be prevented from separation by the lock device 70 in the state of being usually embedded in the driving stand 2. When a collision signal is supplied due to a collision accident, the lock device 70 is released, so the gas supply apparatus 50 can be separated from the driving stand 2. The gas supply apparatus 50 can be joined by a locking means (not shown) or can be installed at a place besides the driving stand 2. However, the gas supply apparatus 50 must maintain a fixed state normally, but must be in a separable state and supply nitrogen gas of a sufficient amount to expand the airbag tubes 11 and 12 in the event of a collision accident.

The nitrogen gas filled in the nitrogen tank 51 of the gas supply apparatus 50 is discharged by an opening and closing device 60. The opening and closing device 60 performs opening and closing by a detection signal of the collision sensor (not shown). The gas supply apparatus 50 is fixed on a fixed belt 40, and a pipe 41 is embedded in the fixed belt 40. The nitrogen gas filled in the nitrogen tank 51 of the gas supply apparatus 50 is supplied to the pipe 41 through the opening and closing device 60.

That is, the nitrogen gas filled in the nitrogen tank 51 is blocked in discharge by the opening and closing device 60 normally. In the event of a collision accident, nitrogen gas is supplied to the pipe 41 from the opening and closing device 60, and then, is supplied to the airbag tubes 11 and 12, such that the airbag tubes 11 and 12 expand.

The male coupler 31 and the female coupler 32 of the coupling device 30 are installed at the leading ends of the movable belt 20 and the fixed belt 40. When the male and female couplers 31 and 32 are coupled, nitrogen gas can flow from the pipe 41 to the pipe 21, and when the male and female couplers 31 and 32 are separated, the supply of nitrogen gas is blocked.

In the present invention, the male coupler 31 is coupled to the female coupler 32 by a conventional coupling means, and is separated from the female coupler 32 when the driver pushes a release button (not shown). So, the supply of nitrogen gas is achieved by the conventional coupling device 30 for coupling and separating the male coupler 31 and the female coupler 32.

The pipe 21 is embedded in the male coupler 31, wherein the pipe 21 is embedded inside the movable belt 20. The pipe 41 is embedded inside the female coupler 32, wherein the pipe 41 is embedded inside the fixed belt 40. The male coupler 31 is fit into the female coupler 32 to complete the coupling device 30. When the pipe 21 is fit to the pipe 41, a supply line of nitrogen gas is completed.

Here, to enhance the adhesion of the pipe 41 and ensure smooth supply of nitrogen gas, the pipe 41 is maintained in a state where it is loaded on a spring 33.

Therefore, in the present invention, when the driver 3 rides on a motorcycle 1, the driver 3 wears the waist belt 10 and couples the movable belt 20 to the coupling device 30 to secure the movable belt 20 to the fixed belt 40. In the event of a collision accident, the gas supply apparatus 50 is detached due to the impact, and the nitrogen gas from the nitrogen tank 51 is supplied to the airbag tubes 1112 of the waist belt 10 through the opening and closing device 60, thereby causing the airbag tubes 1112 to expand. After the safe driving of the motorcycle 1, when the driver 3 breaks away from the motorcycle 1, the movable belt 20 and the fixed belt 40 are separated from the coupling device 30 to allow the driver to move freely.

Figure 2:
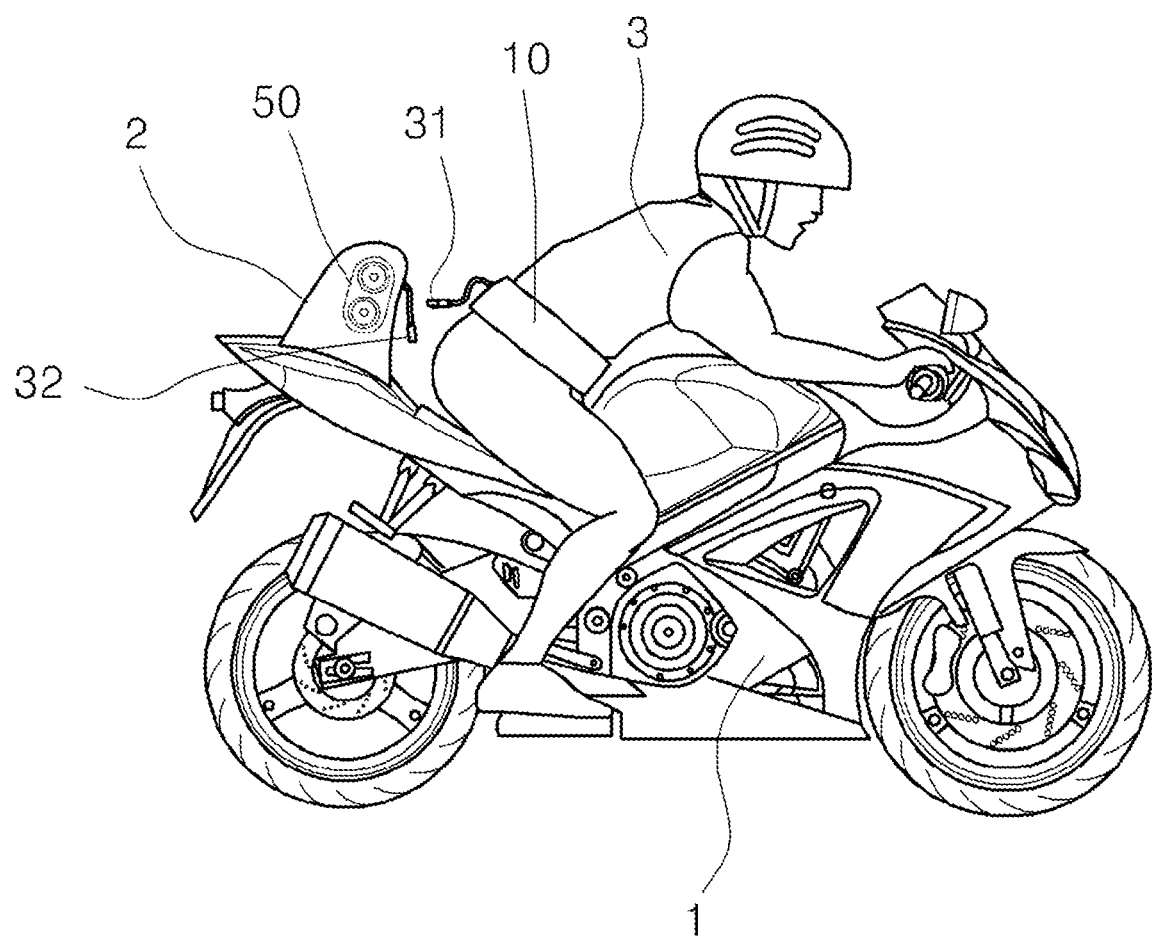
FIG. 2 is a view illustrating a state in which the driver gets off the motorcycle.
Figure 3:
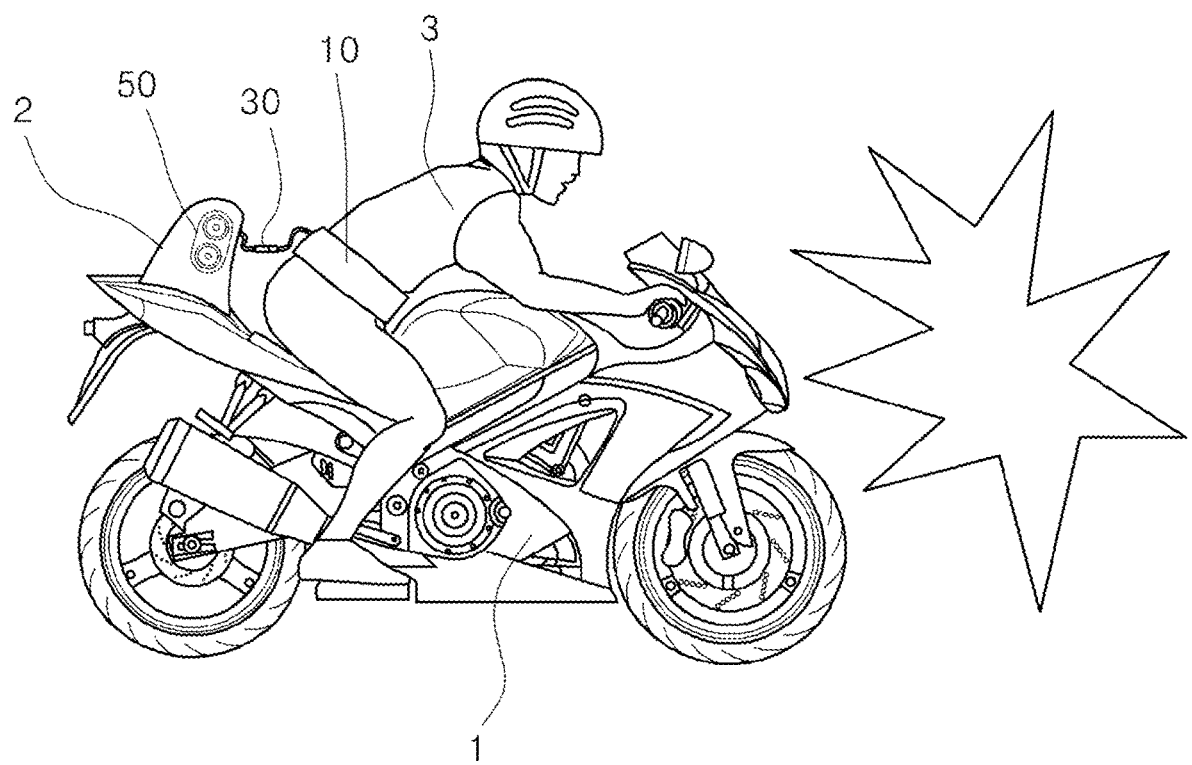
FIG. 3 is a view illustrating a state in which a collision accident occurs while the driver is driving.
Figure 4:
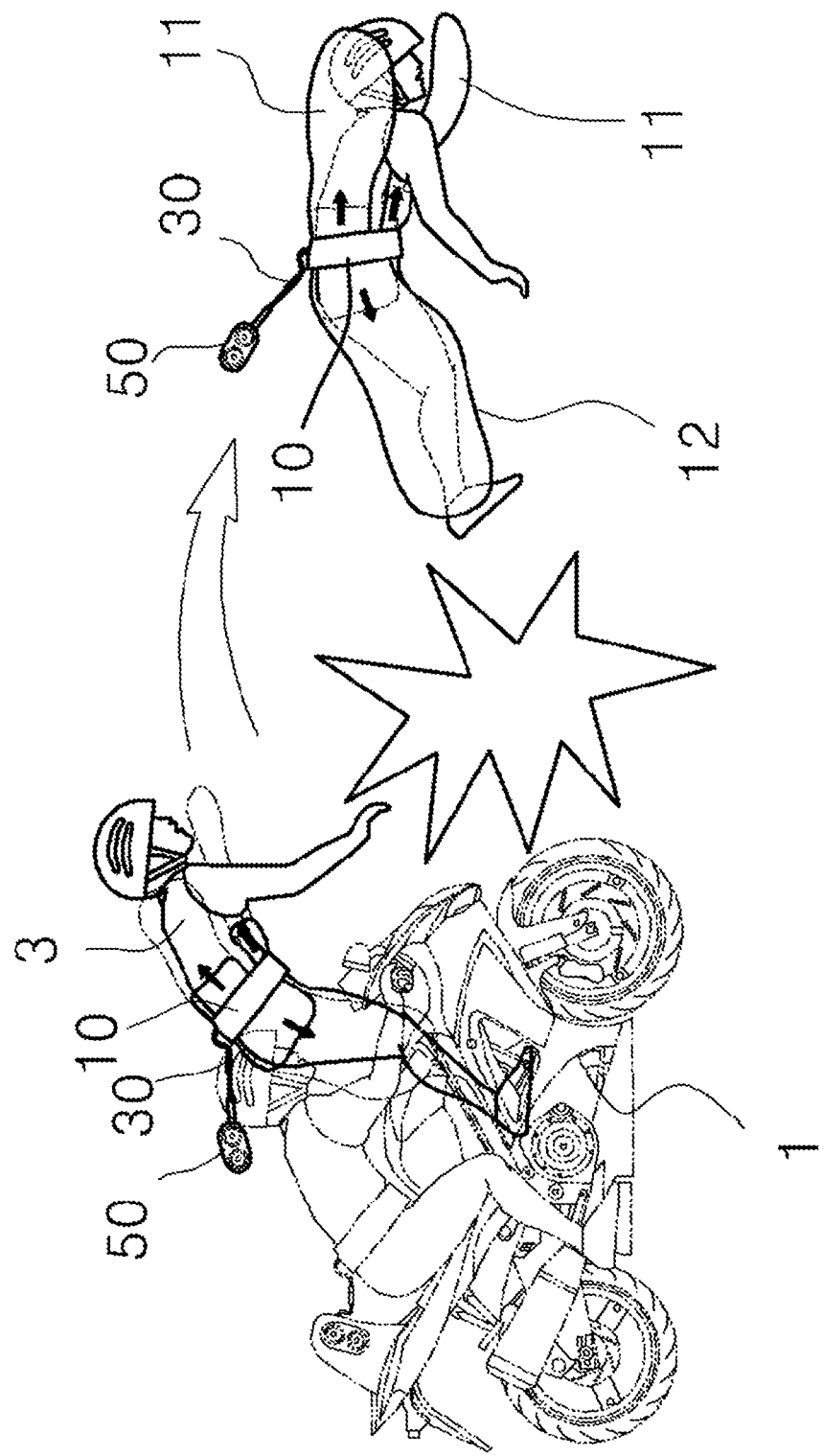
FIG. 4 is a view illustrating a state in which the driver breaks away from the motorcycle in the event of a collision accident.
Figure 5:
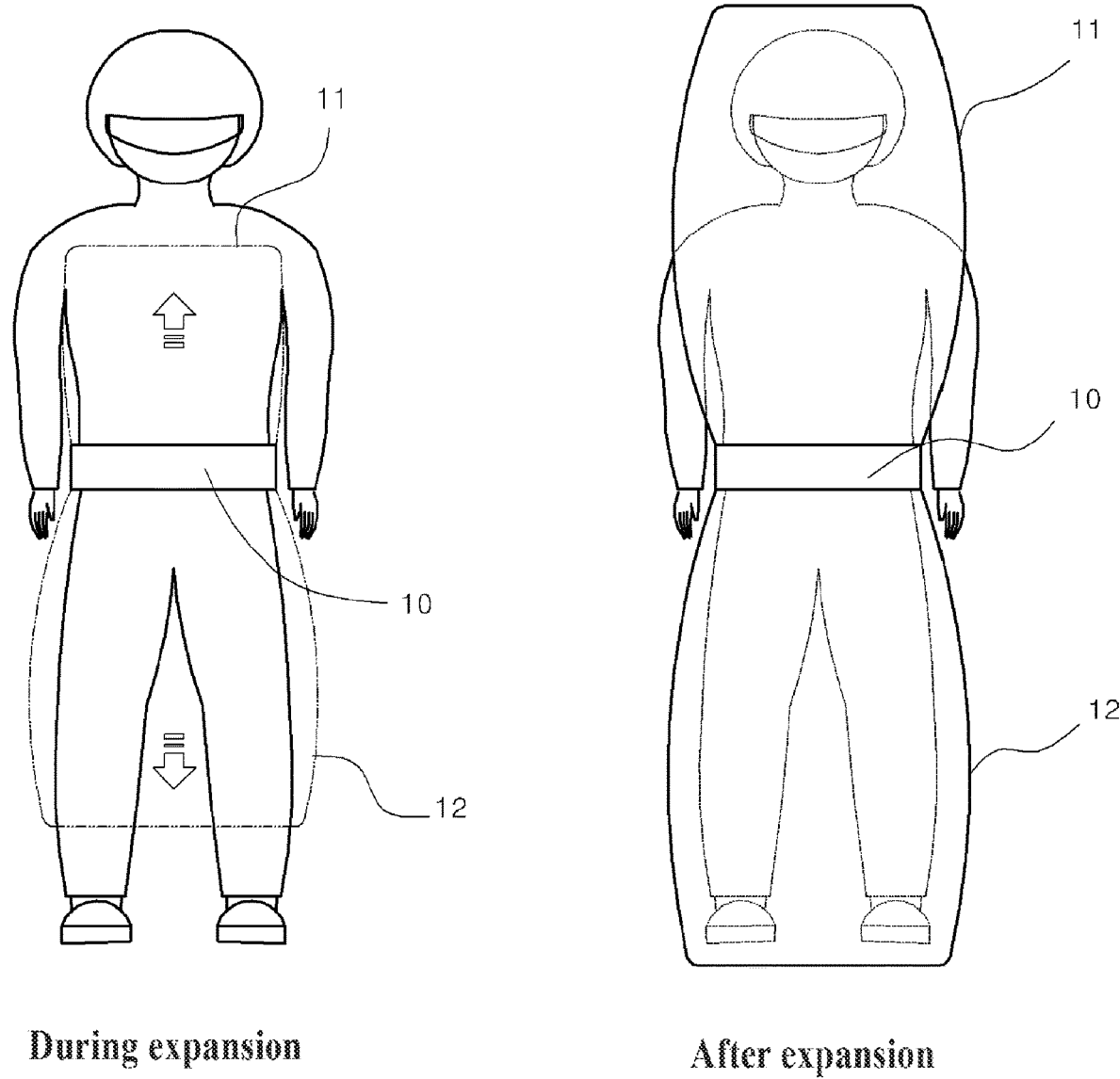
FIG. 5 is a view illustrating a state in which an airbag tube of the present invention expands from a waist belt of the present invention.
Figure 6:
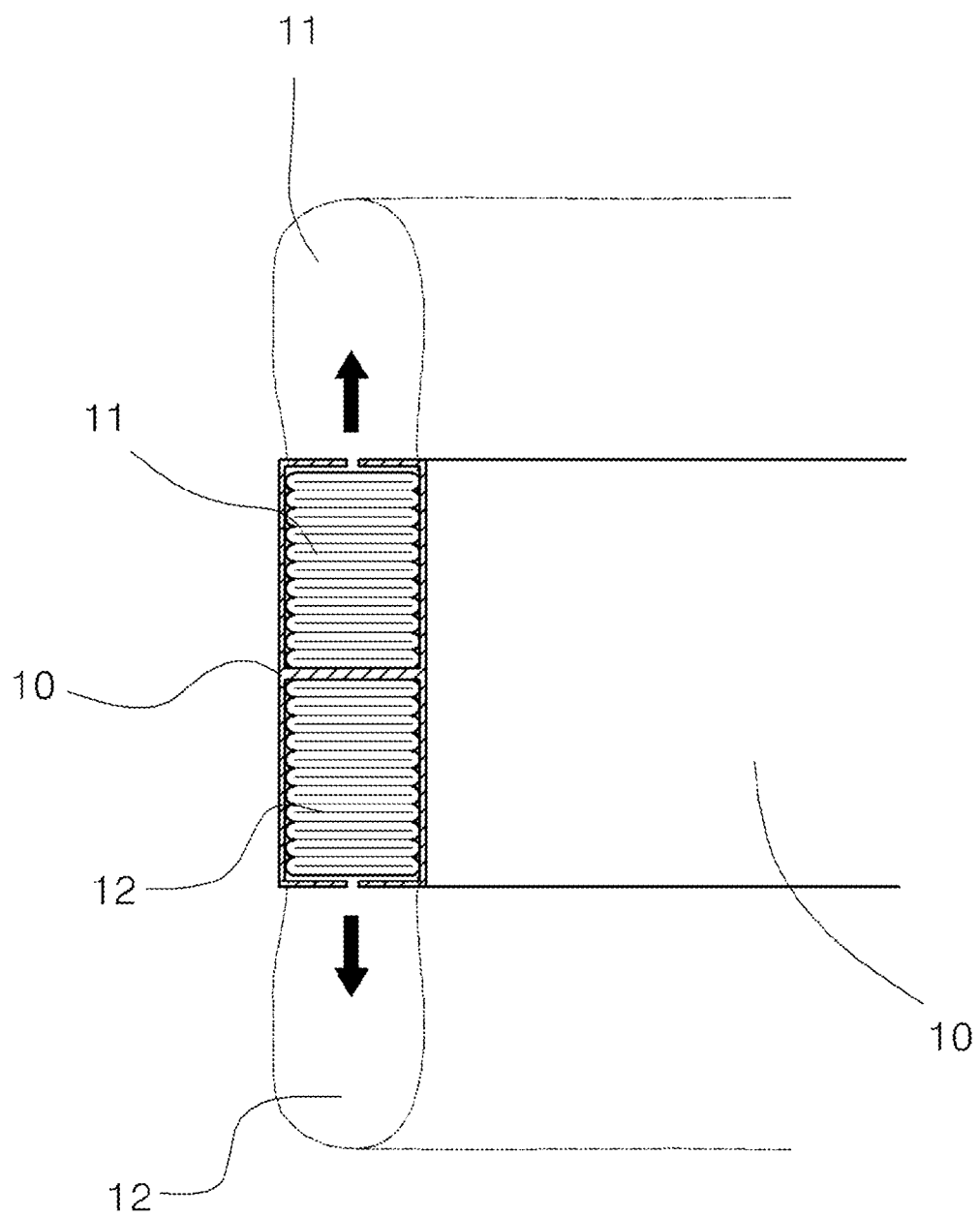
FIG. 6 is an enlarged sectional view illustrating a state in which the airbag tube is embedded in the waist belt of the present invention.
Figure 7:
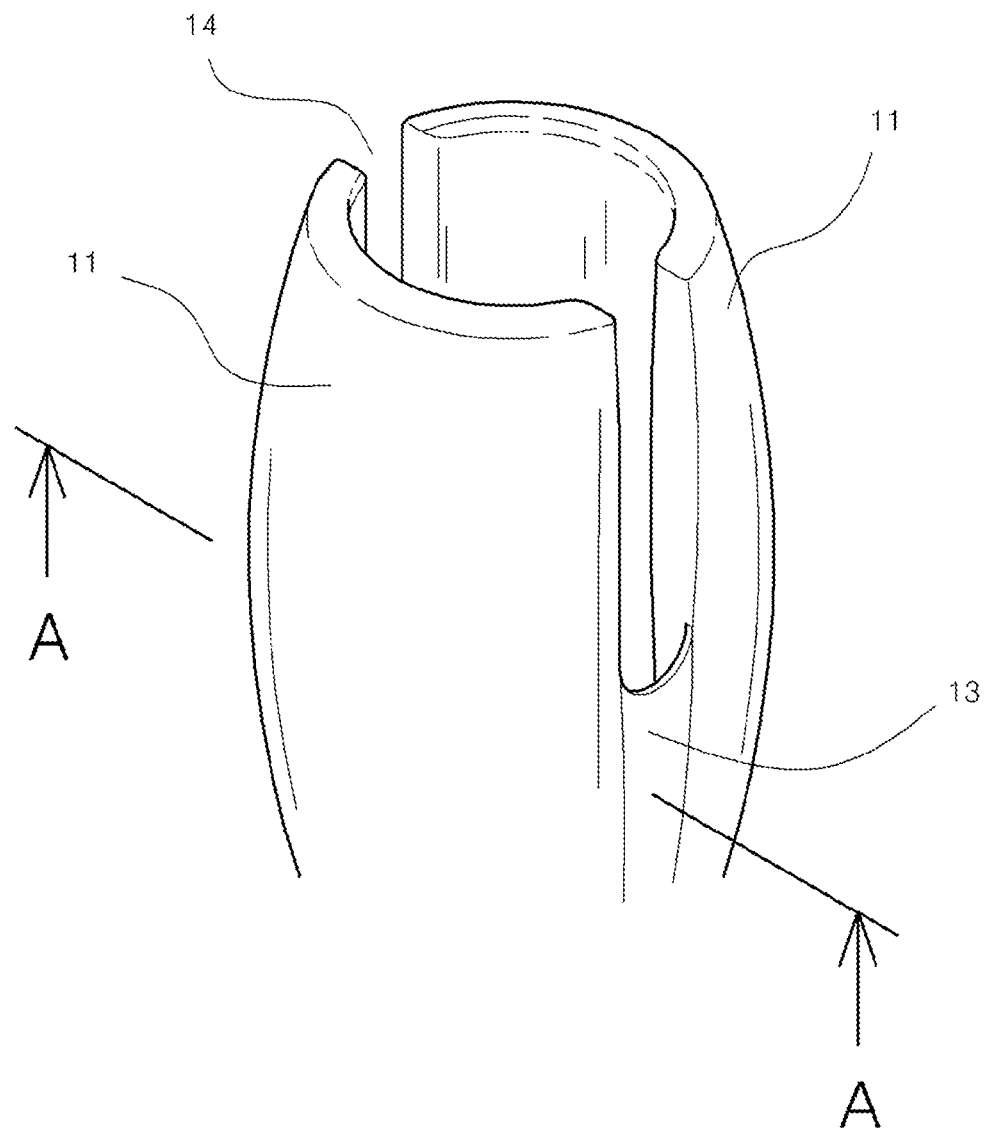
FIG. 7 is a partially perspective view illustrating a state in which the airbag tube of the present invention expands upward from the driver.
Figure 8:
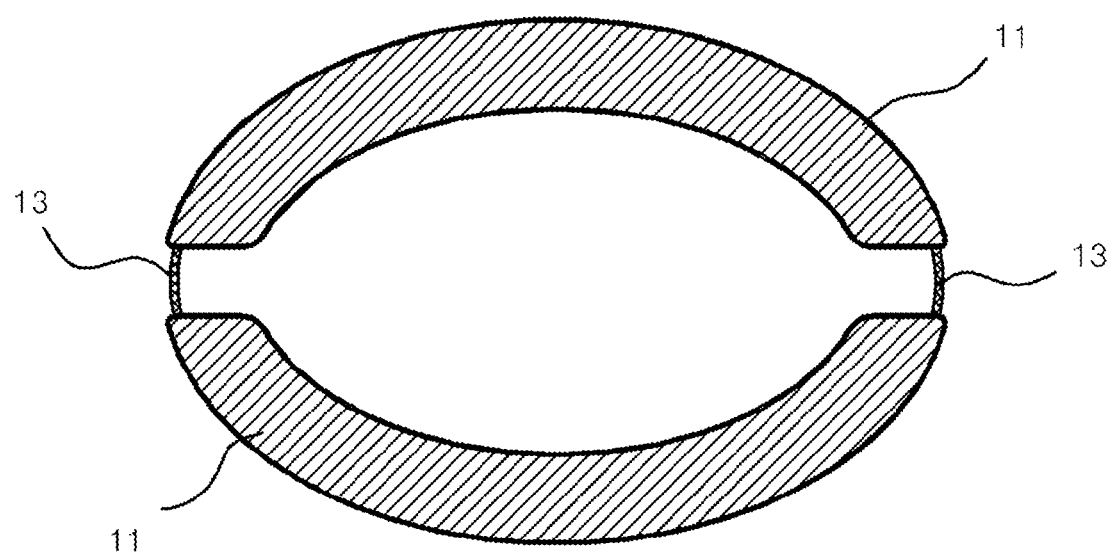
FIG. 8 is a plan sectional view illustrating the expanded state of the airbag tube of the present invention.
Figure 9:
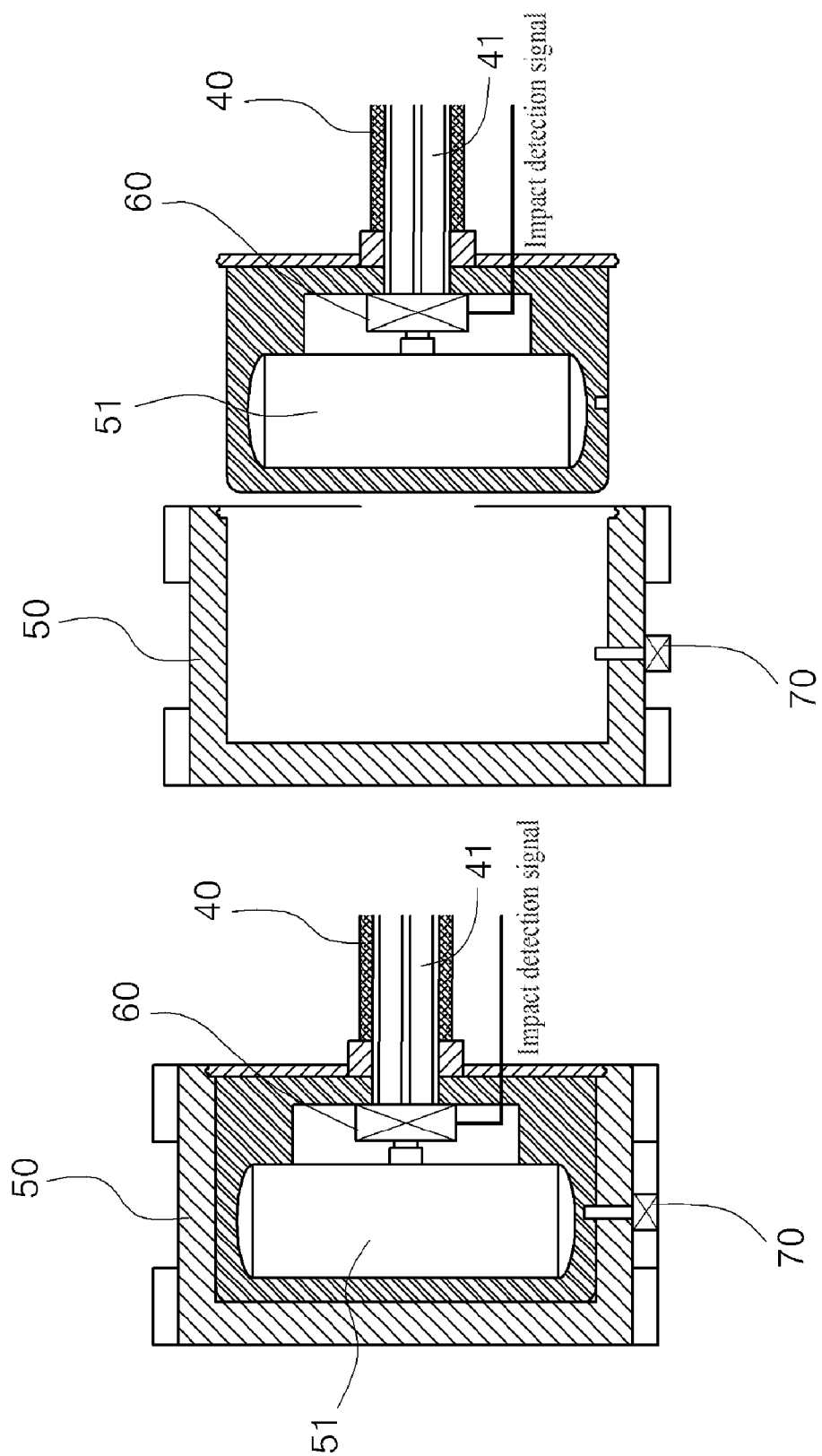
FIG. 9 is a sectional view illustrating states before and after separation of a gas supply apparatus of the present invention.
Figure 10:
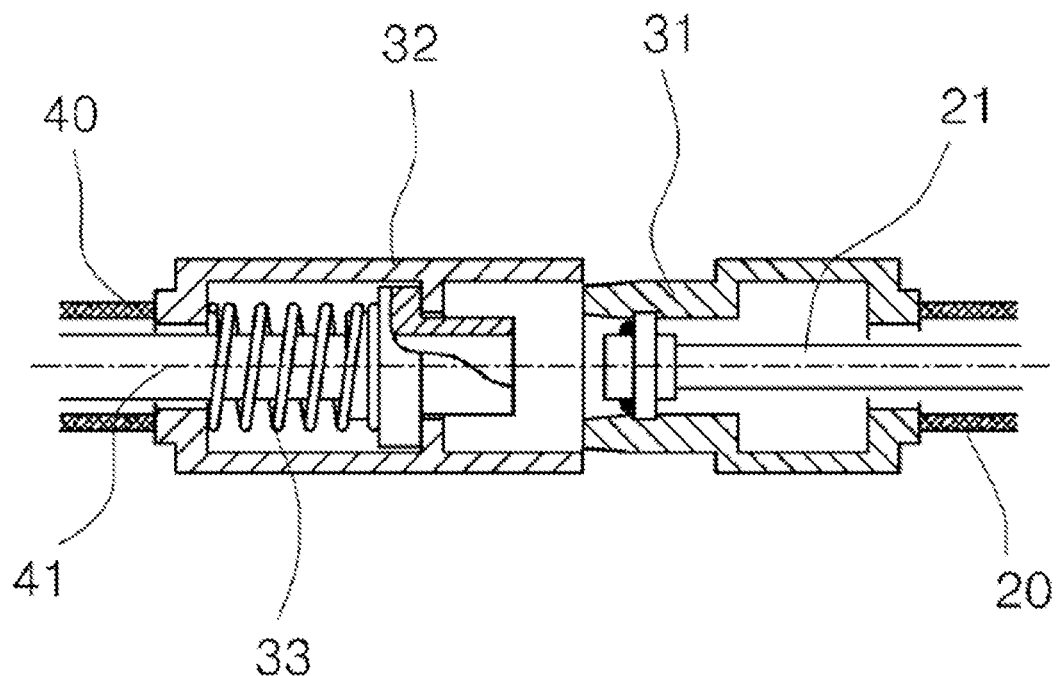
FIG. 10 is a sectional view illustrating a separated state of male and female couplers of the present invention.
Figure 11:
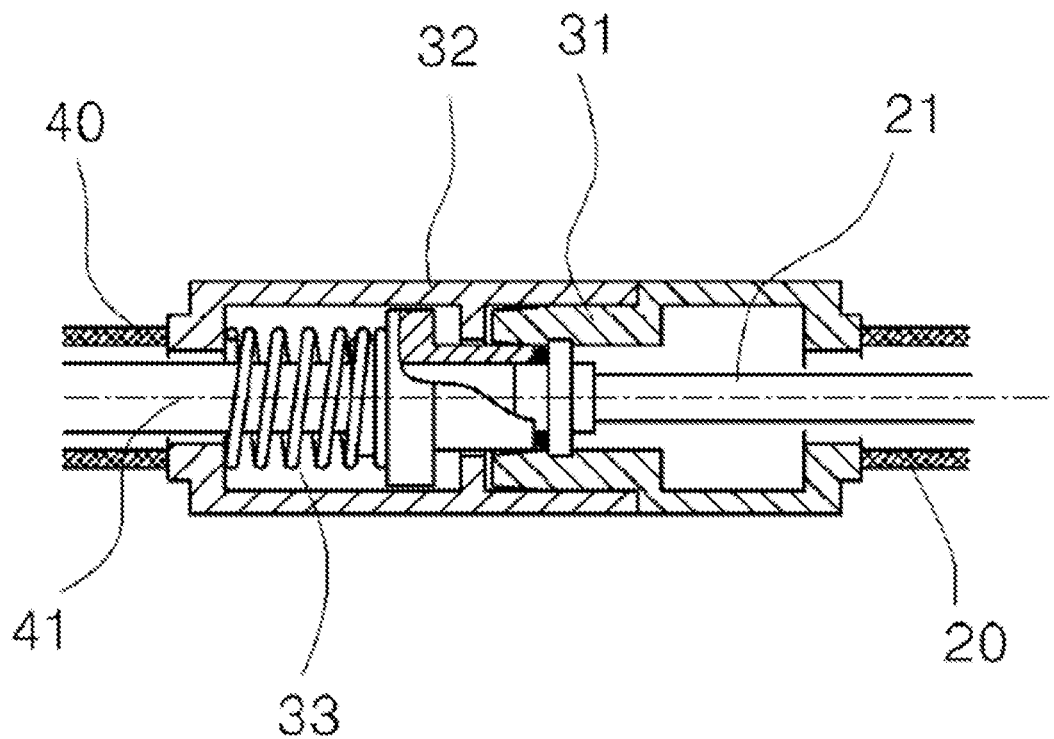
FIG. 11 is a sectional view illustrating a coupled state of the male and female couplers of the present invention.
Figure 12:
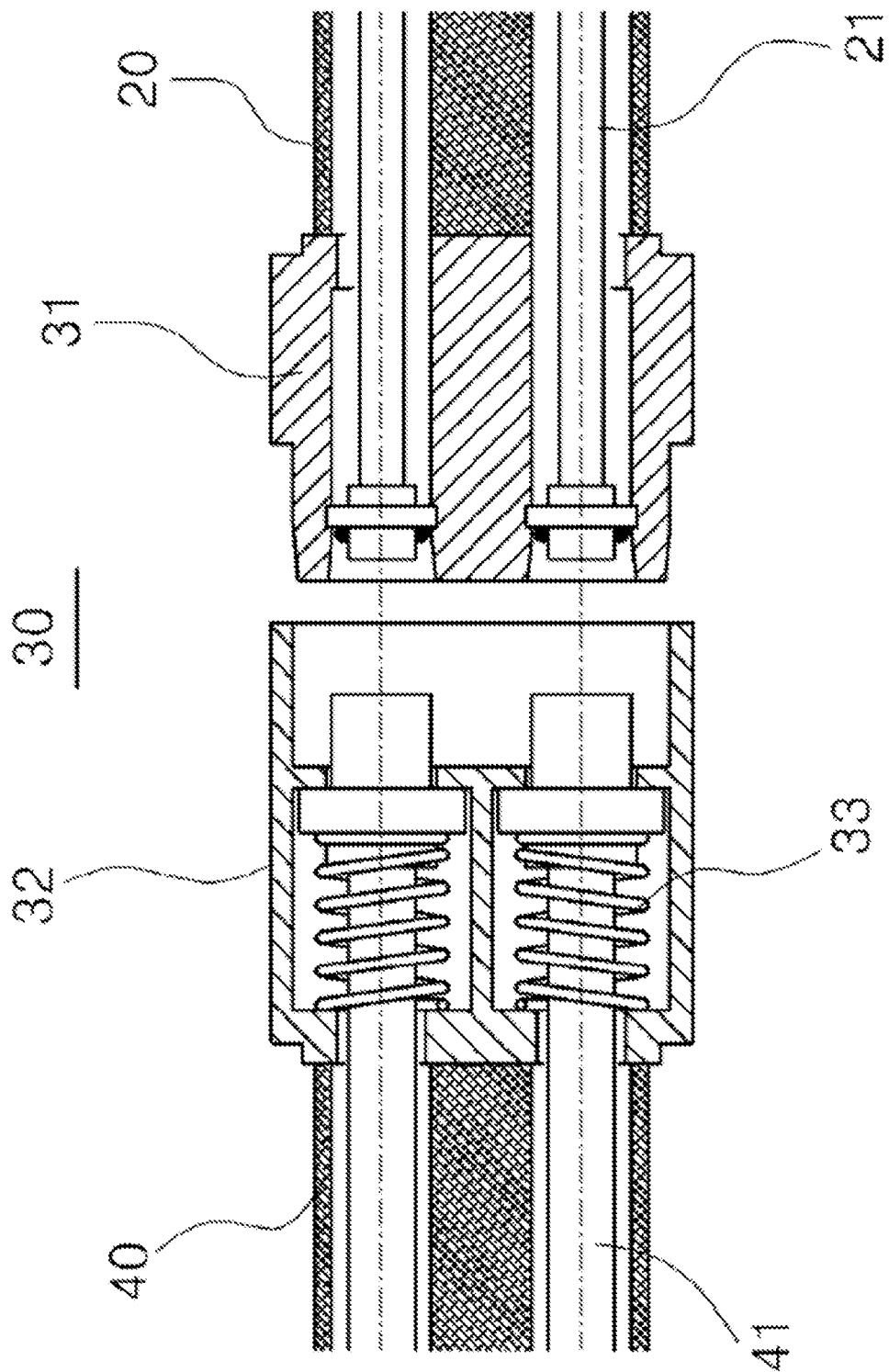
FIG. 12 is a plan sectional view illustrating a state before coupling of a coupling device of the present invention.

When the driver 3 wears the waist belt 10 and drives the motorcycle 1, as illustrated in FIG. 1, the driver 3 couples the coupling device 30. When the driver breaks away from the motorcycle 1, as illustrated in FIG. 2, the driver separates the coupling device 30 to ensure free movement of the driver 3. When a collision accident occurs, as illustrated in FIG. 3, the driver 3 is displaced forward from the motorcycle 1, and as illustrated in FIG. 4, the gas supply apparatus 50 is also separated in the coupled state to the waist belt 10.

The driver 3 drives the motorcycle in the state in which the movable belt 20 of the waist belt 10 worn on the driver and the fixed belt 40 of the gas supply apparatus 50 installed in the driving stand 3 are coupled to the coupling device 30. During the above process, the normal movement of the driver 3 is possible due to the length of the movable belt 20, and in the event of a collision accident, the coupling device 30 remains fixed without disengaging, and is separated from the motorcycle 1 together with the driver 3 in the state of being connected to the waist belt 10 via the fixed belt 40 and the movable belt 20.

That is, the coupling device 30 is not separated in the event of a collision accident since the male and female couplers 31 and 32 are not separated unless the driver presses the release button. Since the lock device 70 and the opening and closing device 60 are released by the detection signal of the collision sensor, at the same time with collision, the gas supply apparatus 50 is separated from the driving stand 2, and nitrogen gas is discharged from the nitrogen tank 51.

Therefore, the gas supply apparatus 50 is separated together with the driver 3 while being connected to the waist belt 10. During the above process, the nitrogen gas of the nitrogen tank 51 is supplied through the pipes 41 and 21 to the airbag tubes 11 and 12, such that the airbag tubes 11 and 12 expand to envelop the front and rear of the driver 3, thereby preventing injury of the driver 3 and reducing impact.

In the event of an collision accident, the gas supply apparatus 50 is separated together with the driver 3 while being connected to the waist belt 10 and expand the airbag tubes 11 and 12. During the above process, the nitrogen tank 51 of the gas supply apparatus 50 is filled with nitrogen gas enough to expand the airbag tubes 11 and 12, such that the airbag tubes 11 and 12 can be sufficiently expand to envelop the front and rear of the driver 3.

Figure 13:
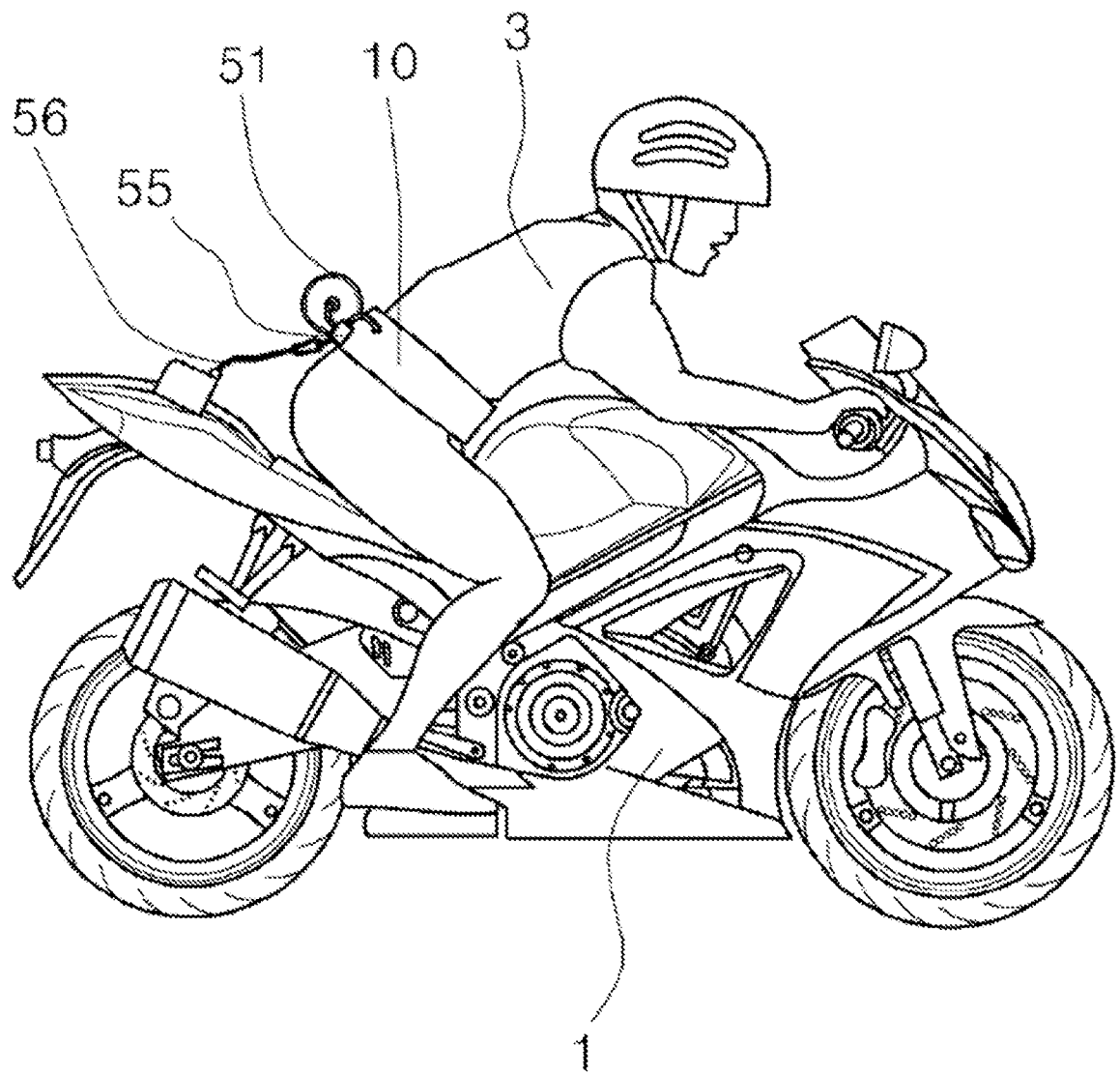
FIG. 13 is a view illustrating a state of a waist belt according to another embodiment of the present invention before a driver wears the waist belt.
Figure 14:
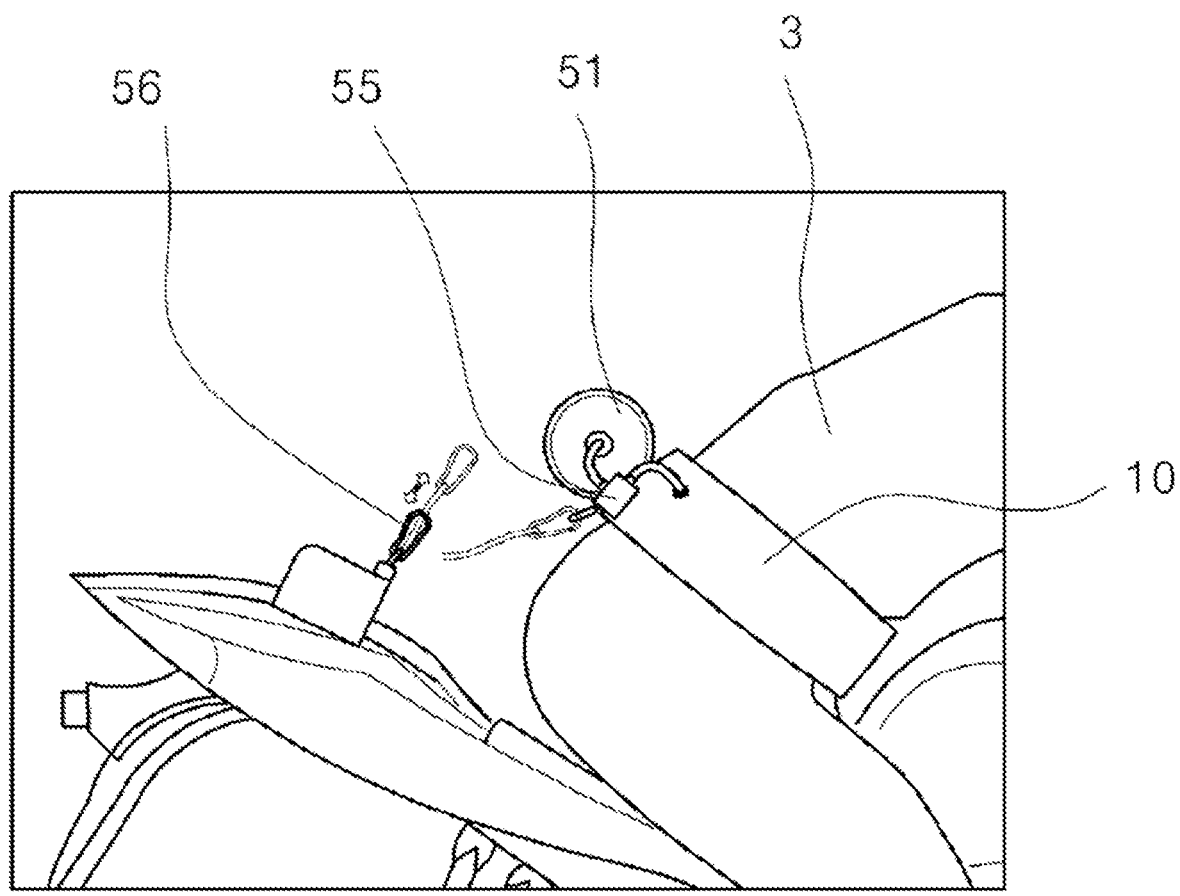
FIG. 14 is an enlarged view of essential parts according to another embodiment of the present invention.
Figure 15:
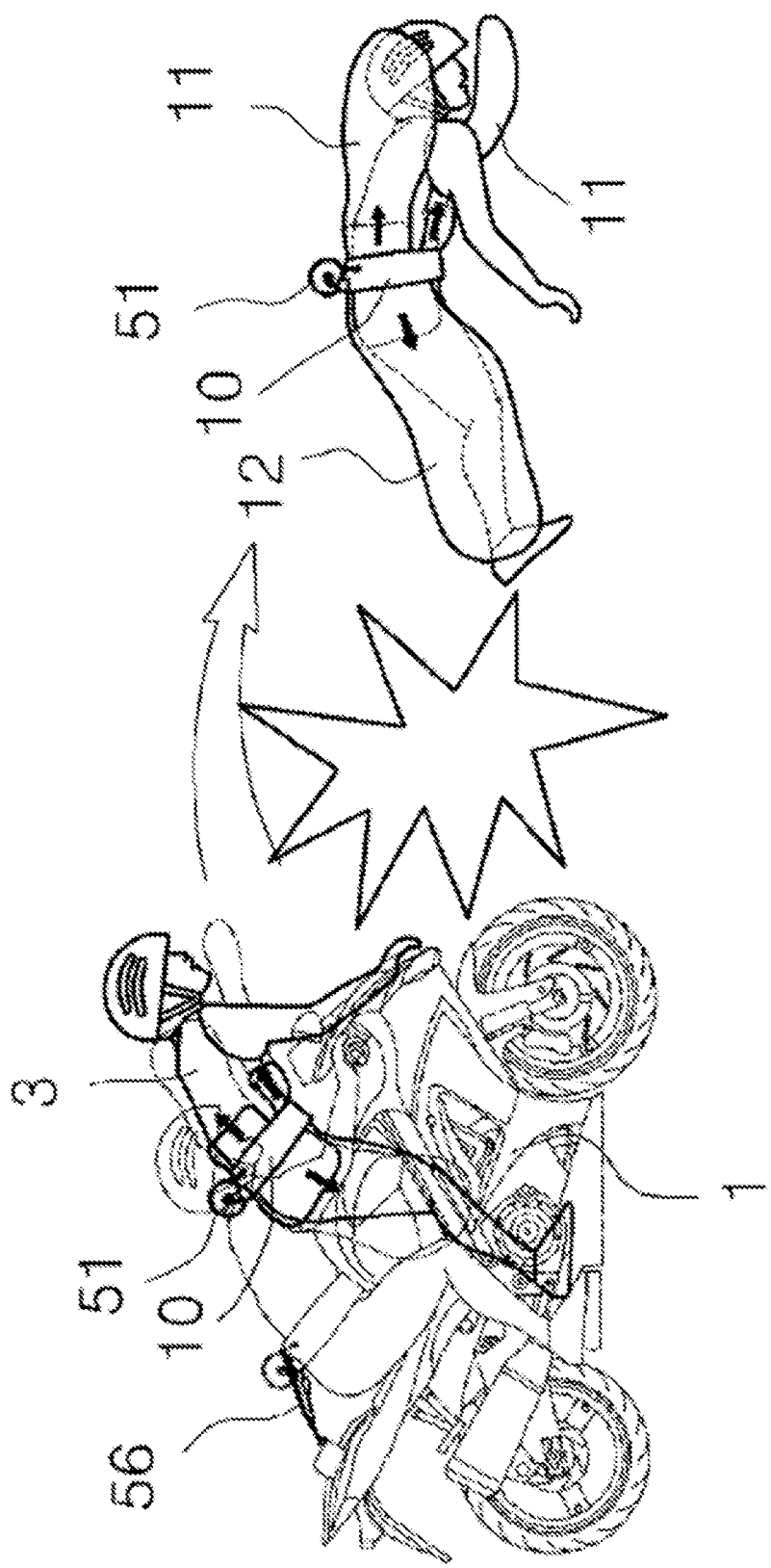
FIG. 15 is a view illustrating a collision state according to another embodiment of the present invention.
Figure 16:
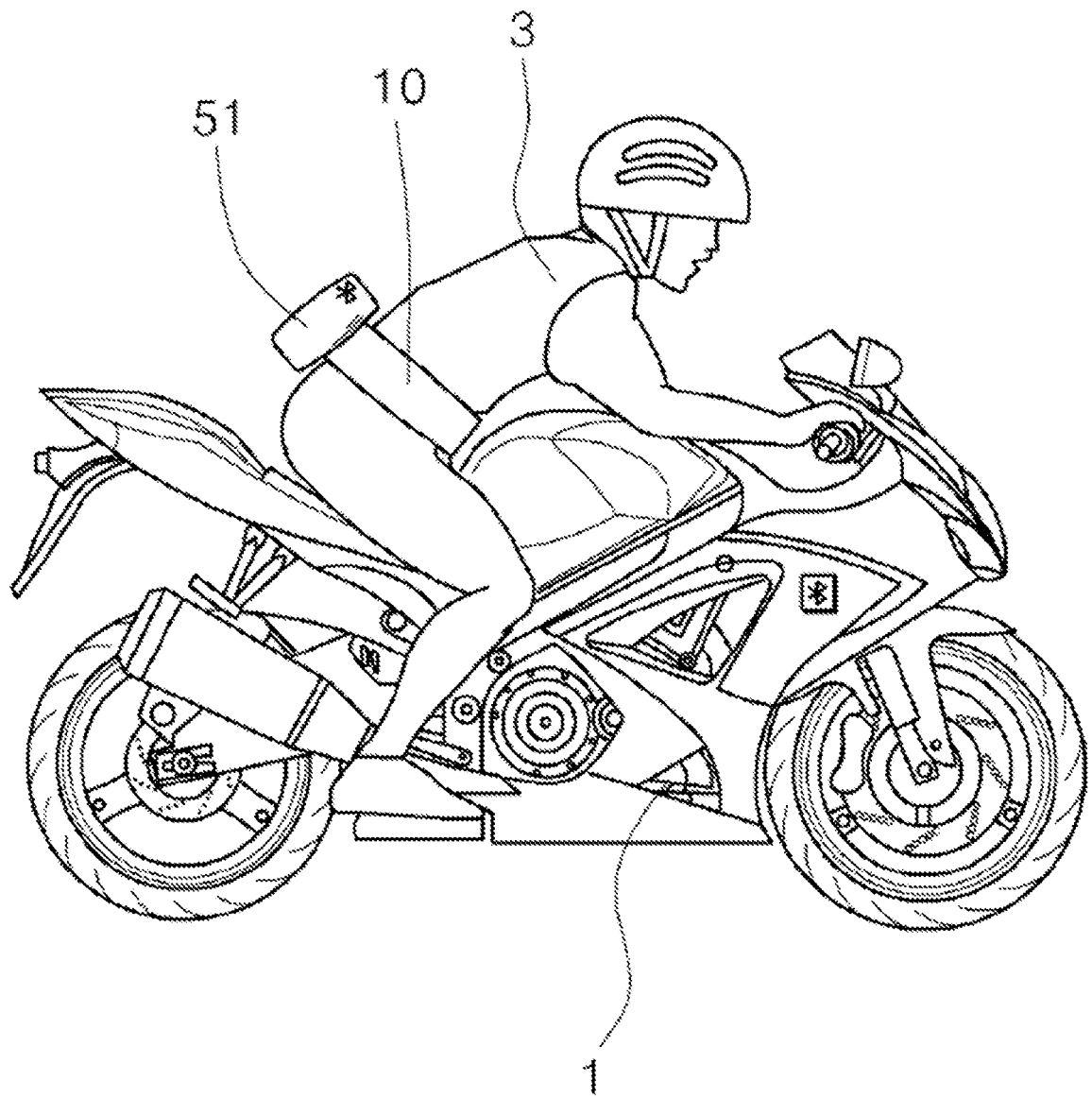
FIG. 16 is a view illustrating a state of a waist belt according to a further embodiment of the present invention before a driver wears the waist belt.

Meanwhile, as illustrated in FIGS. 13 to 15, the nitrogen tank 51 is integrally fixed to the back of the waist belt 10 worn by the driver 3 to move together with the driver 3 when the driver wears the waist belt 10. The nitrogen gas filled in the nitrogen tank 51 is supplied to the airbag tubes 11 and 12 of the waist belt 10 through a gas shut-off device 55. The gas shut-off device 55 is configured to fasten one side of a collision detection strap 56, of which the other side is fixed to the motorcycle 1, via a ring. Accordingly, in the event of a collision accident, when the driver strongly pulls the collision detection strap 56 connected to the gas shut-off device 55, the nitrogen gas of the nitrogen tank 51 is supplied to the airbag tubes 11 and 12 to expand the airbag tubes 11 and 12, thereby protecting the front and rear of the driver 3.

Here, the collision detection strap 56 is connected to the gas shut-off device 55 via a ring when the driver rides on the motorcycle. So, when the driver 3 receives forward propulsion force due to a collision accident, the collision detection strap 56 is pulled to operate the gas shut-off device 55, such that the nitrogen gas filled in the nitrogen tank 51 is supplied to the airbag tubes 11 and 12 of the waist belt 10 to expand the airbag tubes, thereby ensuring the safety of the driver 3. During normal driving, the operation of the gas shut-off device 55 does not occur merely by slight pulling from the driver 3, and the gas shut-off device 55 operates only when pulled strongly due to a significant impact.

In other words, during normal driving, the driver 3 leaves from the motorcycle in the state in which the collision detection strap 56 is not connected and the nitrogen tank 51 is suspended at the back of the waist belt 10. When the driver drives the motorcycle 1, the driver sitting on the seat connects the collision detection strap 56 to the gas shut-off device 55 by retaining the ring, and when the driver breaks away from the driver's seat, the driver releases the ring of the gas shut-off device 55.

When the driver fixes the nitrogen tank 51 integrally to the back of the waist belt 10 worn by the driver 3 and wears the waist belt 10, the nitrogen tank 51 moves together with the driver 3. When driving the motorcycle 1, the driver 3 connects the collision detection strap 56 to the gas shut-off device 55 fixed to the waist belt 10. When not driving the motorcycle 1, and, when not driving the motorcycle 1, the driver 3 releases the connection between the collision detection strap 56 and the gas shut-off device 55 by releasing the ring of the collision detection strap 56.

When the driver 3 sits on the motorcycle 1 for driving, the driver 3 drives in a state in which the ring of the collision detection strap 56 is connected to the ring of the gas shut-off device 55. In this state, if a collision accident occurs, the driver 3 bounces forward due to inertia, and during the above process, the collision detection strap 56 is pulled to operate the gas shut-off device 55. Through the operation of the gas shut-off device 55, the nitrogen gas filled in the nitrogen tank 51 is supplied to the airbag tubes 11 and 12 of the waist belt 10, such that the airbag tubes 11 and 12 of the waist belt 10 expand to envelop the front and rear of the driver 3, thereby protecting the driver 3 from collision accidents.

That is, during normal driving, since the driver 3 can move in the state in which the collision detection strap 56 is not connected and the nitrogen tank 51 is suspended at the back of the waist belt 10, there is no problem in movement except for the nitrogen tank 51 mounted on the back of the waist. When the driver sits on the driver's seat for driving and connect the collision detection strap 56 to the gas shut-off device 55 via the ring, in the event of a collision accident, the gas shut-off device 55 is operated to supply nitrogen gas of the nitrogen tank 51 to the airbag tubes 11 and 12, thereby protecting the driver 3.

Additionally, the present invention recognizes a collision signal to detect collision of the motorcycle 1, and generates a Bluetooth signal. When detecting the Bluetooth signal, the gas shut-off device 55 operates to supply nitrogen gas to the airbag tubes 11 and 12 of the waist belt 10 from the nitrogen tank 51 fixed to the back of the waist belt 10, such that the airbag tubes 11 and 12 can expand to envelop the front and the rear of the driver.

The present invention eliminates the inconvenience of attaching or detaching the collision detection strap 56 when the driver 3 rides on or gets off the motorcycle 1. When the driver 3 rides on the motorcycle 1, Bluetooth connection is achieved. A collision signal generated in the above state is transmitted as a Bluetooth signal, so that nitrogen gas is transferred from the nitrogen tank 51 to the airbag tubes 11 and 12 of the waist belt 10 to expand the airbag tubes 11 and 12 to envelop the front and rear of the driver 3, thereby protecting the driver.

The invention claimed is:

1. A waist belt for protecting a motorcycle driver, which is configured to be worn on the waist of a driver of a motorcycle, comprising:
    airbag tubes expanding vertically inside the waist belt,
    wherein the airbag tubes are configured to expand to envelop the front and rear of the driver when nitrogen gas is supplied,
    wherein the airbag tubes further are further configured to expand upward from the waist belt, each of the airbag tubes comprises an exposure groove configured to allow an arm of the driver to fit laterally, and a connection fabric connecting the airbag tubes is configured to expand while being fit to an armpit of the driver.

2. A safety device for a motorcycle driver, comprising a waist belt configured to be worn on the waist of a driver of a motorcycle,
    wherein the waist belt includes airbag tubes configured to envelop the front and rear of the driver when nitrogen gas is supplied,
    wherein a nitrogen tank supplying nitrogen gas to the airbag tubes is installed in a gas supplier, which is embedded in a driving stand of the motorcycle, is coupled to a locker, and is configured to be separated from the driving stand by the locker when a collision accident occurs,
    wherein a fixed belt is fixed to the gas supplier, and a movable belt is fixed to the waist belt, and the fixed belt and the movable belt are coupled through a coupler,
    wherein the gas supplier in which the nitrogen tank is embedded maintains a state of being fixed to the driving stand by the locker device released from a locked state only when the collision accident occurs, and
    wherein the nitrogen gas filled in the nitrogen tank is supplied to the airbag tubes embedded in the waist belt by a barricade opened only when the collision accident occurs, such that the airbag tubes expand to envelop the front and rear of the driver.

3. The safety device according to claim 2, wherein the coupler includes a male coupler and a female coupler, the male coupler is installed at the leading end of the movable belt fixed at the rear of the waist belt, the female coupler is installed at the fixed belt connected to the gas supplier, pipes are respectively embedded in the movable belt and in the fixed belt, and when the male coupler and the female coupler are coupled, the pipes are fit together such that the nitrogen gas is supplied through the pipes.

4. The safety device according to claim 3, wherein the coupler of which the male coupler and the female coupler are fastened is released from a coupled state when the driver presses a release button, and
    wherein in the coupled state of the coupler, when the collision accident occurs, the gas supplier is separated.

* * * * *